United States Patent
Kojima

(10) Patent No.: US 10,298,856 B2
(45) Date of Patent: May 21, 2019

(54) IMAGING DEVICE

(71) Applicant: CLARION CO., LTD., Saitama (JP)

(72) Inventor: Takahide Kojima, Saitama (JP)

(73) Assignee: CLARION CO. LTD., Saitama (JP)

( * ) Notice: Subject to any disclaimer, the term of this patent is extended or adjusted under 35 U.S.C. 154(b) by 0 days.

(21) Appl. No.: 15/755,818

(22) PCT Filed: Aug. 2, 2016

(86) PCT No.: PCT/JP2016/072685
§ 371 (c)(1),
(2) Date: Feb. 27, 2018

(87) PCT Pub. No.: WO2017/033687
PCT Pub. Date: Mar. 2, 2017

(65) Prior Publication Data
US 2018/0332209 A1  Nov. 15, 2018

(30) Foreign Application Priority Data

Aug. 27, 2015 (JP) ................................. 2015-167605

(51) Int. Cl.
*H04N 5/235* (2006.01)
*H04N 9/04* (2006.01)
(Continued)

(52) U.S. Cl.
CPC .......... *H04N 5/2355* (2013.01); *H04N 5/225* (2013.01); *H04N 5/232* (2013.01); *H04N 9/0455* (2018.08); *H04N 9/07* (2013.01); *H04N 9/68* (2013.01)

(58) Field of Classification Search
CPC ...... H04N 5/2355; H04N 5/225; H04N 5/232; H04N 5/332; H04N 5/33; H04N 9/0455;
(Continued)

(56) References Cited

U.S. PATENT DOCUMENTS

| 4,642,677 A * | 2/1987 | Takanashi | H04N 9/045 348/223.1 |
| 6,992,718 B1 * | 1/2006 | Takahara | G02B 23/14 348/333.09 |

(Continued)

FOREIGN PATENT DOCUMENTS

| CN | 1992910 | 7/2007 |
| EP | 2 866 445 | 4/2015 |

(Continued)

OTHER PUBLICATIONS

International Search Report dated Oct. 18, 2016 in International (PCT) Application No. PCT/JP2016/072685.

*Primary Examiner* — Alexander Gee
(74) *Attorney, Agent, or Firm* — Wenderoth, Lind & Ponack, L.L.P

(57) ABSTRACT

To obtain a color signal having a wide dynamic range (i.e., high sensitivity) and color reproducibility similar to human vision characteristics regardless of the amount of the near infrared components contained in light captured by an imaging device. The imaging device is configured to receive light which has transmitted through the filters selectively transmit light having different wavelengths from each other, to generate an output signal RAW0 by converting the received light using the image pickup element 102 having the plurality of pixels, and to remove, by a removal rate E (Rr) determined in accordance with the ratio Rr of near infrared light component calculated for each pixel, the near infrared light component for each pixel from the generated output signal RAW0, to thereby generate an infrared-separated signal (Ra, Ga, Ba).

3 Claims, 12 Drawing Sheets

(51) Int. Cl.
*H04N 5/225* (2006.01)
*H04N 9/07* (2006.01)
*H04N 5/232* (2006.01)
*H04N 9/68* (2006.01)

(58) Field of Classification Search
CPC ............ H04N 9/07; H04N 9/68; H04N 9/646; H04N 9/045; H04N 9/77; H04N 2209/047; B60R 1/00; B60R 2300/106
See application file for complete search history.

(56) References Cited

U.S. PATENT DOCUMENTS

| | | | |
|---|---|---|---|
| 7,194,146 B2 * | 3/2007 | BenDaniel | G06T 5/00 348/207.1 |
| 7,920,908 B2 * | 4/2011 | Hattery | A61B 5/0059 600/407 |
| 8,218,099 B2 * | 7/2012 | Yamazaki | H01L 27/1225 349/43 |
| 8,324,626 B2 * | 12/2012 | Kimura | H01L 27/1225 257/59 |
| 8,994,848 B2 * | 3/2015 | Husoy | H04N 5/332 348/223.1 |
| 2006/0097978 A1 * | 5/2006 | Ng | G02F 1/133603 345/102 |
| 2006/0178565 A1 * | 8/2006 | Matsui | A61B 1/00009 600/160 |
| 2007/0146512 A1 * | 6/2007 | Suzuki | H04N 5/332 348/272 |
| 2008/0278602 A1 * | 11/2008 | Otsu | H04N 5/23296 348/223.1 |
| 2009/0326383 A1 * | 12/2009 | Barnes | A61B 5/0059 600/476 |
| 2011/0228097 A1 * | 9/2011 | Motta | H04N 5/33 348/164 |
| 2011/0267482 A1 * | 11/2011 | Wetzstein | G06T 5/50 348/218.1 |
| 2011/0310277 A1 * | 12/2011 | Imamura | G02B 5/201 348/279 |
| 2012/0306940 A1 * | 12/2012 | Machida | G02B 6/005 345/690 |
| 2015/0172618 A1 | 6/2015 | Takahashi et al. | |
| 2015/0373278 A1 * | 12/2015 | Hattori | H04N 5/332 348/148 |
| 2016/0248953 A1 * | 8/2016 | Fujita | H04N 5/2256 |

FOREIGN PATENT DOCUMENTS

| | | |
|---|---|---|
| JP | 2007-202108 | 8/2007 |
| JP | 2014/165528 | 9/2014 |
| WO | 2014/129319 | 8/2014 |

* cited by examiner

FIG.5A

| X | Y | X | Y |
|---|---|---|---|
| T | Z | T | Z |
| X | Y | X | Y |
| T | Z | T | Z |

FIG.5B

| R | G | R | G |
|---|---|---|---|
| C | B | C | B |
| R | G | R | G |
| C | B | C | B |

FIG.5C

| R11 | G12 | R13 | G14 |
|-----|-----|-----|-----|
| C21 | B22 | C23 | B24 |
| R31 | G32 | R33 | G34 |
| C41 | B42 | C43 | B44 |

FIG. 10

| LIGHT SOURCE | RATIO (Rr) OF NEAR INFRARED LIGHT COMPONENT | REMOVAL RATE E (Rr) OF NEAR INFRARED LIGHT COMPONENT | PURPOSE OF SETTING REMOVAL RATE E (Rr) |
|---|---|---|---|
| INFRARED LIGHT LED | 90~100% | 0% | PREVENT COLOR NOISE FROM INCREASING |
| INCANDESCENT LAMP | 70~89% | 100% | REMOVE NEAR INFRARED LIGHT COMPONENT TO REALIZE ACCURATE COLOR REPRODUCTION |
| SUNLIGHT | 60~69% | 100% | |
| DISCHARGE LAMP | 10~59% | 100% | |
| LED | 0~9% | 0% | PREVENT DECREASE OF S/N RATIO CAUSED BY REMOVING NEAR INFRARED LIGHT COMPONENT |

IMAGING DEVICE

CROSS-REFERENCE TO RELATED APPLICATION

The present application is based on and claims priority from Japanese Patent Application No. 2015-167605, filed on Aug. 27, 2015, the disclosure of which is hereby incorporated by reference in its entirety.

TECHNICAL FIELD

This disclosure relates to an imaging device with an image pickup element. In particular, this disclosure relates to an imaging device capable of generating an appropriate color image when imaging a photographic subject having a large difference in brightness and darkness (i.e., dynamic range).

BACKGROUND ART

As interest in prevention and safety against traffic accident is increasing, a research and development of an imaging device for on-vehicle monitoring system has been actively conducted. Such an imaging device is expected to be a part of a driving support system for automobiles. To this end, it is desirable to achieve a high monitoring performance to allow the device to distinguish the colors of traffic lights and lanes under a condition in which a difference or contrast between brightness and darkness is so large that the visibility is poor. Such a condition may occur when a high-luminance signal light and/or a vehicle lamp (e.g., headlight) is illuminated in darkness of night. That is, it is desirable for an imaging device to realize a wide dynamic range and color reproducibility consistent with human color vision characteristics.

In order to improve the monitoring performance of pedestrians and lanes in darkness, IR color cameras have been provided. IR color cameras use a color filter that transmits near infrared rays and performs color reproduction with sensitivity in the near infrared light region.

The IR color cameras do not have an infrared ray cut filter (IR cut filter). That is, the IR color cameras are sensitive to light in the near infrared light region. Therefore, by observing the near infrared light emitted from an observation target or by observing the reflected light of near infrared light emitted from an infrared light projector, the IR color cameras can perform imaging even in the darkness where light from a head lamp of a vehicle is not irradiated. In other words, the IR color cameras expand the image sensitive luminance range so as to expand the dynamic range thereof.

JP2014-165528A (PLT 1) teaches an imaging device that can acquire an output signal having a broad dynamic range (i.e., high sensitivity) and color reproducibility similar to human color vision characteristics. To be specific, the imaging device of PLT 1 takes an image using an IR color camera, acquires a luminance signal, which includes both visible light and near infrared light, and a color signal, which is obtained by removing only the near infrared light component from a color signal including both the visible light and the near infrared light, and combine the luminance signal and the color signal appropriately to acquire the output signal.

SUMMARY

Technical Problem

The imaging device of PLT 1 removes all infrared light components from the color signals. Therefore, when the imaging device images a light source that only emits near infrared light, all the near infrared light component of the light source are removed and, theoretically, the color signal becomes zero. However, in reality, as some noise components are mixed in the imaged signal, the noise components remain and appear in the color signal after removing the near infrared light component. The color signal mixed with the remained noise components will be scaled by the luminance signal containing the near infrared light component and be recombined into one signal. As a result, color noise is, disadvantageously, generated by the noise components remained in the recombined signal.

Here, a case where near infrared light component are completely removed from color signals by adding or subtracting the color signals (R, G, B, C) obtained from the pixels of the image pickup elements will be considered. When color signals (R, G, B, C) containing near infrared light component are obtained from a pixel of the image pickup element, each of the color signals contains a component described in the following Equations 1 to 4.

$$R = NIR + r + N\_R \qquad \text{Equation 1}$$

$$G = NIR + g + N\_G \qquad \text{Equation 2}$$

$$B = NIR + b + N\_B \qquad \text{Equation 3}$$

$$C = NIR + r + g + b + N\_C \qquad \text{Equation 4}$$

In the Equations, NIR represents the near infrared light component, while each of r, g, and b represents the respective color component of the visible light. Each of N_R, N_G, N_B, and N_C represents a noise component contained in the corresponding color signal (R, G, B, C). Note each of the noise components (N_R, N_G, N_B, N_C) includes residual charge during the photoelectric conversion, shot noise, leakage of an electric charge, compression noise of the nonlinear sensor, and the like. Here, the residual charge and the shot noise are steadily generated, and the leakage of the electric charge and the compression noise are randomly generated.

By performing the calculation of R-G-B+C with the aforesaid Equations 1 to 4, the following Equation 5 is obtained:

$$R - G - B + C = 2r + N\_R + N\_G + N\_B + N\_C. \qquad \text{Equation 5}$$

As shown, it is possible to remove the near infrared light component NIR. On the other hand, the output of the color component becomes double (2r), and the output of the noise components becomes four times (N_R+N_G+N_B+N_C) greater. As a result, the S/N ratio of the color components is decreased to half, disadvantageously.

An object of this disclosure is, therefore, to provide an imaging device capable of reducing the influence of the noise and of obtaining color signals having a wide dynamic range (i.e., high sensitivity) and color reproducibility similar to human vision characteristics regardless of the amount of the near infrared components contained in an image signal captured by the imaging device.

Solution to Problem

An imaging device according to an embodiment of this disclosure obtains color signals having a wide dynamic range (i.e., high sensitivity) and color reproducibility similar to human vision characteristics regardless of the amount of the near infrared components contained in the light captured by the imaging device.

Specifically, the imaging device according to an embodiment of this disclosure includes an optical filter on which a plurality of filters is arranged in a predetermined manner. The plurality of filters includes three types of filters configured to selectively transmit light of a visible light region having different wavelengths from each other and to have spectral transmittances equal to each other in a near infrared light region, and one type of filter in which a spectral transmittance of the visible light region is expressed by a linear sum of the spectral transmittances of the three types of filters and which has a spectral transmittance equal to the spectral transmittances of the three types of filters in the near-infrared light region. The imaging device further includes an image pickup element including a plurality of pixels which receive light transmitted through the optical filter, convert the received light into an output signal in accordance with luminance of incident light incident to each of the pixels, and output the output signal from each of the pixels, a near infrared light ratio calculating part which calculates a ratio of near infrared light component contained in the output signal for each of the pixels, and an infrared separating part which removes, by a removal rate determined in accordance with the ratio of the near infrared light component, the near infrared light component from each of the output signals for each of the pixels to generate an infrared-separated signal.

BRIEF DESCRIPTION OF DRAWINGS

FIG. 5A is a diagram showing an example of an array of color filters of the image pickup element used in the First Embodiment of this disclosure;

FIG. 5B is a diagram showing a filter arrangement in which color filters for selectively transmitting red color light, green color light, blue light color, and entire visible light are applied to the color filters of FIG. 5A;

FIG. 5C is an explanatory view for explaining a method of calculating a lacking color signal based on color signals obtained through the color filters of FIG. 5B;

FIG. 10 is a diagram showing an example of ratios Rr of the near infrared light component for popular light sources and removal rates E (Rr) of the near infrared light component set for each light source;

DESCRIPTION OF EMBODIMENT

First Embodiment

Hereinafter, an imaging device according to the First Embodiment of this disclosure will be described with reference to the accompanying drawings. In the embodiment, the imaging device is applied to a surrounding monitoring apparatus. The surrounding monitoring apparatus monitors surroundings of a vehicle and sends a warning and/or turns on a warning lamp for a passenger of the vehicle based on the images taken or recognition results of the images taken by the imaging device.

Schematic Configuration of Imaging Device

Figure 1:
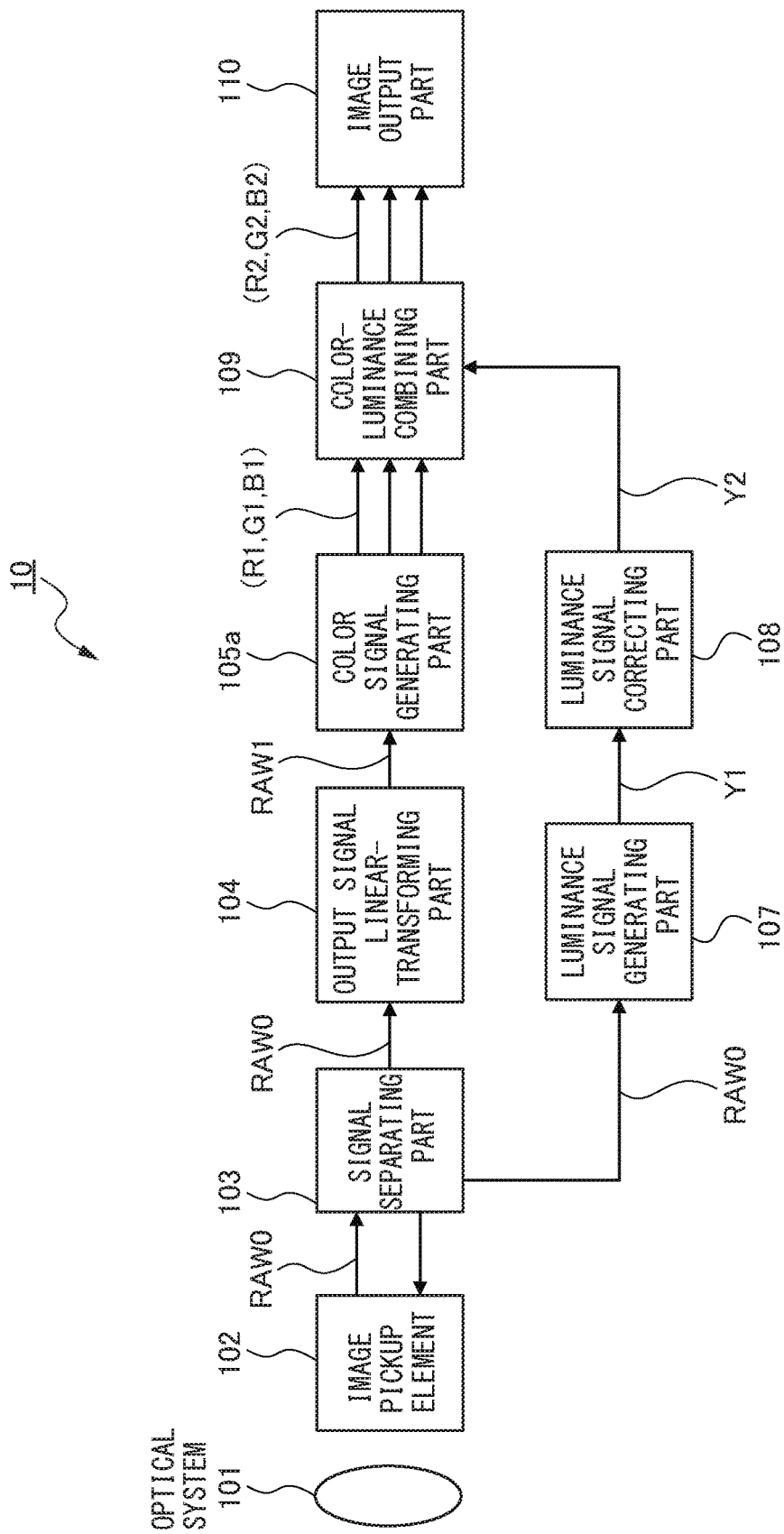
FIG. 1 is a block diagram showing a schematic configuration of an imaging device according to a First Embodiment of this disclosure.

The configuration of the imaging device will be described with reference to the drawings. As illustrated in FIG. 1, the imaging device 10 according to this Embodiment is installed to a vehicle (not illustrated). The imaging device 10 includes an optical system 101 for observing a photographic subject, an image pickup element 102, a signal separating part 103, an output signal linear-transforming part 104, a color signal generating part 105a, a luminance signal generating part 107, a luminance signal correcting part 108, a color-luminance combining part 109, and an image output part 110.

The optical system 101 includes optical elements such as a lens and a mirror, and guides light emitted from a photographic subject or light reflected by the photographic subject onto the image pickup element 102. With the imaging device for on-vehicle monitoring system, the optical system 101 uses a pan-focus lens of narrow-angle, wide-angle, fish-eye, or the like. The optical system 101 may use a lens system including a zoom mechanism and an auto-focus mechanism. Alternatively, the optical system 101 may use a lens system including an aperture and a shutter. Additionally, the optical system 101 may use a lens system including various types of filters such as an optical low-pass filter, a band separation filter, and a polarizing filter, to improve quality and color reproducibility.

The image pickup element 102 has a plurality of pixels. An image of the photographic subject observed through the optical system 102 is formed, and the generated light is inputted to the image pickup element 102. The inputted light is then photoelectric-converted into an output voltage signal e in accordance with luminance of the light. The converted output voltage signal e is digitalized through an amplifier (not illustrated) installed inside of the image pickup element 102 and an AD converter (not illustrated) also installed inside of the image pickup element 102, and an output signal RAW0 is generated. As the output signal RAW0, for example, a signal digitized in 12-bit (0-4095) may be outputted. As the image pickup element 102, a photoelectric converting element, such as a CMOS image sensor and a CCD image sensor, may be used. Such a photoelectric converting element has a dynamic range of approximately 120 dB input luminance at a maximum. As described later, on a surface of each pixel constituting the image pickup element 102, four types of filters (i.e., red filter R, green filter G, blue filter B, and clear filter C) having different transmittance wavelength bands are regularly and systematically arranged, and form an optical filter.

The signal separating part 103 instructs the image pickup element 102 a timing to image the photographic subject, receives the output signal RAW0 of the image captured by the image pickup element 102, and separates the output signal RAW0 into two identical output signals RAW0 and RAW0.

The output signal linear-transforming part 104 transforms one of the output signals RAW0, which is separated by the signal separating part 103, into a linearized output signal RAW 1 through gradation transforming process (i.e., linearization process). The details of this transforming process will be described later.

The color signal generating part 105a separates the linearized output signal RAW1 transformed in the output signal linear-transforming part 104 into four signals corresponding to the light transmitted through the RGBC color filters, respectively. Within the image pickup element 102, the pixel E, in which the red filter R is arranged, outputs only a red color component. Therefore, the color signal generating part 105a performs linear interpolation using the outputs from the pixels in the vicinity of the pixel E and predicts linear-interpolated color signals (R0, G0, B0, C0) in the pixel E. The color signal generating part 105a then calculates a ratio Rr of the near infrared light component contained in the linear-interpolated color signals (R0, G0, B0, C0), and separates and removes an amount of the near infrared light component in accordance with the calculated ratio Rr to generate infrared-separated color signals having linearity. Further, the color signal generating part 105a performs color correction on the infrared-separated color signal to generate linear-corrected color signals (R1, G1, B1).

Further, the color signal generating part 105a performs clipping process to a saturated pixel and detects a saturated region in which color saturation occurs. The color signal generating part 105a then outputs the appropriate linear-corrected color signals (R1, G1, B1) depending on whether it is a pixel being part of the saturated region or not. Note that the color signal generating part 105a includes the structure as shown in detail in FIG. 8, and the specific configuration and the specific process executed by the color signal generating part 105a will be described later.

The luminance signal generating part 107 generates a luminance signal Y1 from the other output signal RAW0 of the output signals RAW0, RAW0 separated in the signal-separating part 103. The process executed herein will be described later.

The luminance signal correcting part 108 corrects the luminance signal Y1 generated in the luminance signal generating part 107 as necessary, and generates a luminance corrected signal Y2. The process executed herein will be described later.

The color-luminance combining part 109 combines the linear corrected color signals (R1, G1, B1) and the luminance corrected signal Y2, and generates video signals (R2, G2, B2). The process executed herein will be described later.

The image output part 110 is, for example, a display monitor and outputs the video signals (R2, G2, B2) combined in the color-luminance combining part 109 in a viewable form.

Figure 2:
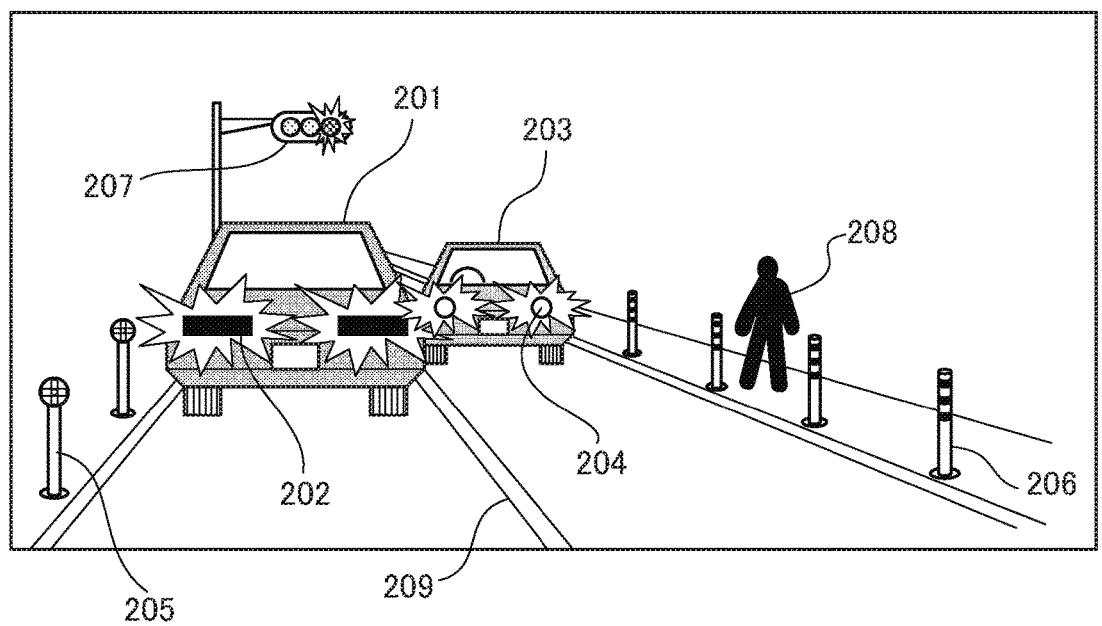
FIG. 2 is a view illustrating an example of a scene to which the First Embodiment of this disclosure is applied.

Hereinafter, the operation of the imaging device 10 will be described with reference to the drawings one by one. First, a specific scene to which the imaging device 10 is applied will be described with reference to FIG. 2. FIG. 2 shows an example of an image that is obtained by imaging a road using the imaging device 10 at night. Specifically, FIG. 2 represents a scene in which a preceding car 201, an oncoming vehicle 203, reflectors 205, 206 such as road signs, a traffic light 207, a pedestrian 208, and a lane marker 209 on the road are imaged and picturized.

Figure 3:
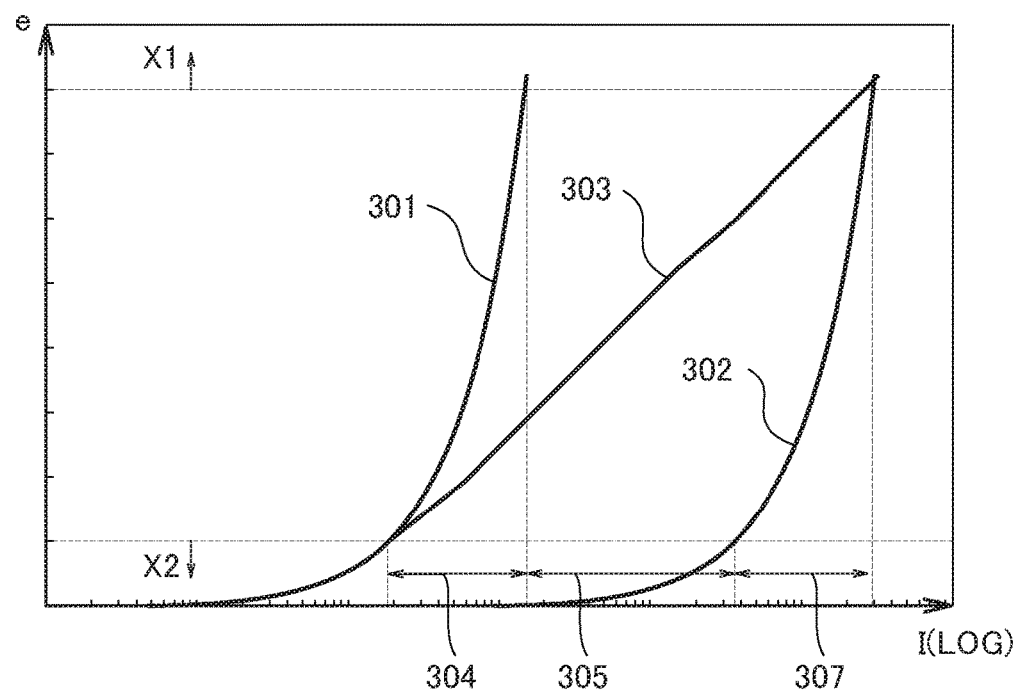
FIG. 3 is an explanatory view for explaining input-output characteristics of an image pickup element.

FIG. 3 shows a relationship between input luminance I and output voltage signal e when the road shown in FIG. 2 is imaged and picturized by a conventional image pickup element having linear input-output characteristics.

That is, FIG. 3 shows input-output characteristics when two different exposure times are used with the image pickup element 102. To be specific, FIG. 3 shows an input-output characteristic 301 when the exposure time is relatively long, an input-output characteristic 302 when the exposure time is relatively short, and an input-output characteristic 303. The input-output characteristic 303 is considered to be capable of generating an appropriate color image without occurrence of blown-out highlights or blocked-up shadows when all of the photographic subjects on the road are imaged and picturized.

In a night scene exemplarily shown in FIG. 2, the difference or contrast between brightness and darkness is extremely large. Therefore, when such a scene is imaged by an image pickup element having linear output characteristics, blown-out highlights or blocked-up shadows may occur as the output may exceed a limit of the dynamic range.

As shown as an input luminance range 304 in FIG. 3, when the exposure time is determined to allow the area, in which the headlight of the own vehicle and a road lighting are not illuminated, and the area, in which the lane marker 209 and the pedestrian 208 exist, to be imaged with an easily viewable brightness; since the lane marker 209 and the pedestrian 208 hardly reflect the headlight or the road lighting, it is desirable to select the input-output characteristic 301. However, with the input-output characteristic 301, the output voltage signal e is saturated in an input luminance range 307, in which several high luminance areas illuminated by the headlight 204 exist, and/or in an input luminance range 305 in which a distribution frequency of a taillight 202 is high. As a result, a so-called "blown-out highlights" phenomenon occurs (i.e., a range X1 in FIG. 3 shows the range in which the blown-out highlights occur).

On the other hand, when the exposure time is determined to allow the input luminance range 307, in which the high luminance areas illuminated by the headlight 204 exist, to be imaged with an easily viewable brightness, it is desirable to select the input-output characteristic 302. However, with the input-output characteristic 302, the output voltage signal e becomes extremely small in the input luminance range 304, in which a distribution frequency of the lane marker 209 and the pedestrian 208 is high, and the input luminance range 305, in which the distribution frequency of the taillight 202 is high. As a result, a so-called "blocked-up shadows" phenomenon occurs (i.e., a range X2 in FIG. 3 shows the range in which the blocked-up shadows occur).

When the input-output characteristic 303 is selected and the scene is imaged using the input-output characteristic 303, the output voltage signal e fits in a range in which neither the blown-out highlights nor the blocked-up shadows occur for both the images of the lane marker 209, which is the most dark part, and of the headlight 204, which is the most bright part. The input-output characteristic of the image pickup element 102 used in this Embodiment is similar to the input-output characteristic 303.

Input-Output Characteristics of Image Pickup Elements

Figure 4A:
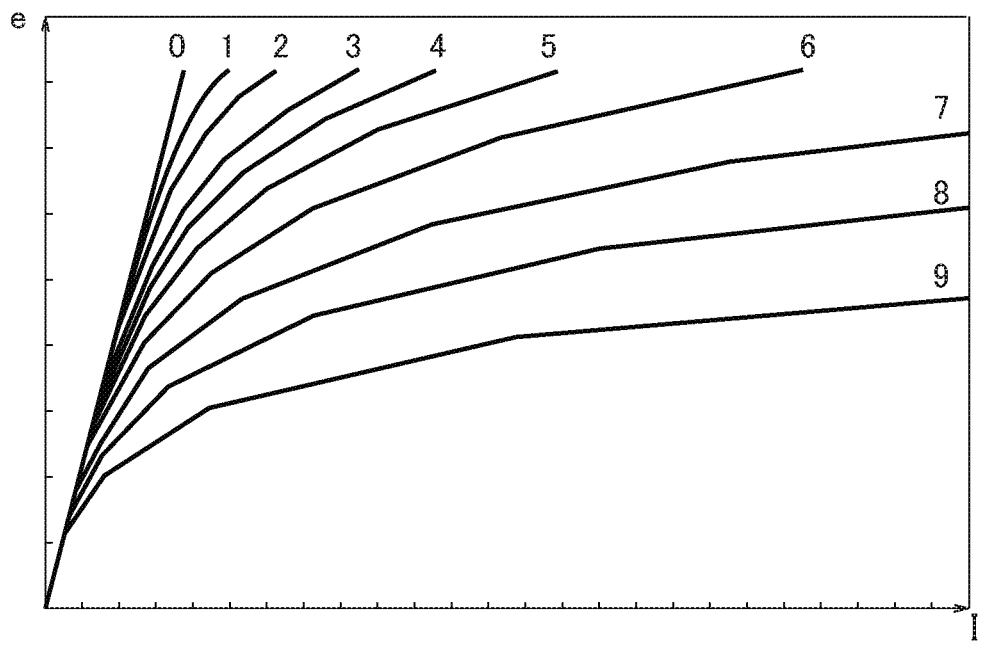
FIG. 4A is a graph showing an example of input-output characteristics of the image pickup element used in the First Embodiment of this disclosure.

The operation of the imaging device 10 will be described one by one. As shown in FIG. 4A, the image pickup element 102 includes a plurality of input-output characteristics. The input-output characteristics may be changed and switched by adjusting a rest timing or a reset voltage of an electrical charge accumulated in each pixel of the image pickup element 102 that has received incident light.

Further, with the input-output characteristics, the output voltage e changes non-linearly with respect to the input luminance I, as illustrated in FIG. 4A. This is a well-known input-output characteristic for a photoelectric conversion element of a logarithmic transformation type.

Figure 4B:
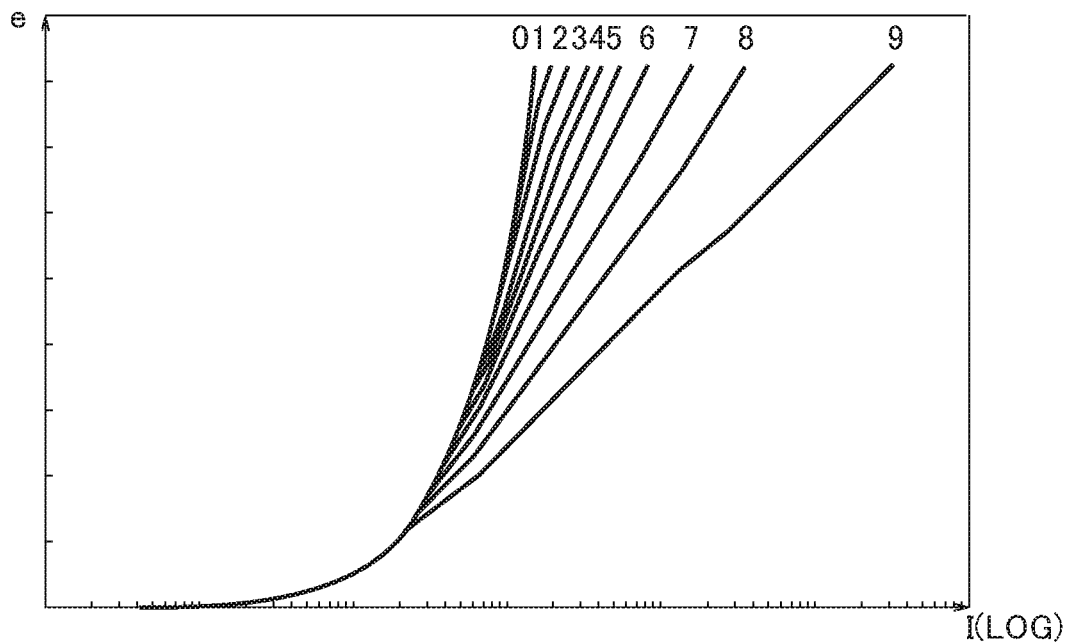
FIG. 4B is a graph in which the horizontal axis of FIG. 4A is converted into a logarithmic scale.

FIG. 4B is a graph in which the horizontal axis of the graph in FIG. 4A is converted into a logarithmic scale. FIG. 4B shows that the dynamic range of the input luminance I outputtable without occurring blown-out highlights or blocked-up shadows can change depending on the differences of the input-output characteristics.

Specifically, in FIG. 4A and FIG. 4B, as the number allocated to the input-output characteristics becomes greater, the dynamic range of the input luminance I becomes wider.

Here, in accordance with the scenes to be imaged, one of the plurality of input-output characteristics shown in FIG. 4A is selected by an exposure controller (not illustrated) embedded in the image pickup element 102. For example, based on the brightness of the imaging scene, the input-output characteristics that can take an image having a contrast ratio as high as possible without occurrence of blown-out highlights or blocked-up shadows will be selected to capture an image.

Specifically, in the exposure controller embedded in the image pickup element 102, outputs statistics information of an image per frame is calculated and the number of the pixel having blown-out highlights or the blocked-up shadows is also calculated. When a blown-out highlight is detected, the dynamic range having a wide input-output characteristic is selected. When a blown-out highlight is not detected, the dynamic range having a narrow input-output characteristic is selected.

When a blocked-up shadow is detected, the dynamic range having a narrow input-output characteristic is selected. When a blocked-up shadow is not detected, the dynamic range having a wide input-output characteristic is selected.

Filter Configuration of Image Pickup Element

The image pickup element 102 two-dimensionally includes a plurality of pixels which outputs an output voltage signal e shown in FIG. 4A or FIG. 4B. As shown in FIG. 5A, an optical filter is formed on the light-receiving surface of each pixel. That is, the optical filter has three types of filters X, Y, Z and a fourth filter T which are regularly arranged on the light-receiving surface of each pixel. The three types of filters X, Y, Z selectively transmit visible light for each wavelength and have transmittances equal to each other with respect to near infrared light. The fourth filter T has the transmittance of the visible light for each wavelength as a linear sum of the transmittances of the three types of filters and has transmittance equal to those of the three types of filters with respect to the near infrared light.

Figure 7A:
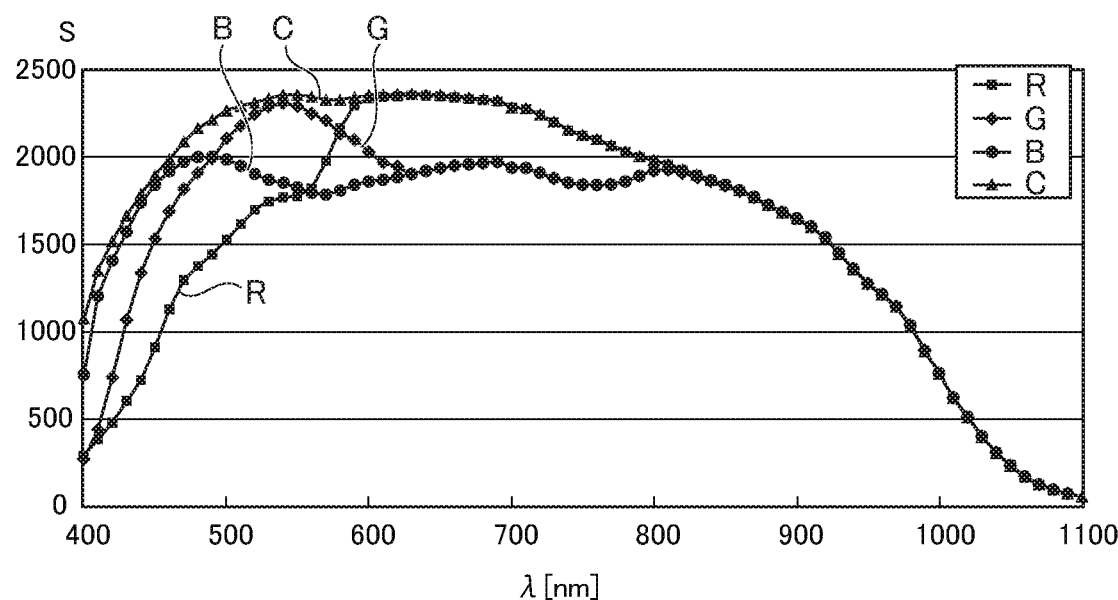
FIG. 7A is a graph showing an example of spectral transmittance characteristics of an optical filter used in the First Embodiment of this disclosure.

FIG. 7A shows a spectral sensitivity S representing an output value of the image pickup element 102 for each wavelength. On the image pickup element 102, an RGB filter, which is used in many image pickup elements, is arranged as an example of the optical filter having the above-mentioned characteristics. That is, as shown in FIG. 5B, the aforesaid three types of filters X, Y, Z correspond to a red color filter R, a green color filter G, and a blue color filter B, respectively. Further, a clear filter C through which the entire visible light including the near infrared light passes or transits is applied to the fourth filter T.

Although a boundary between the visible light and the near infrared light is not clear in FIG. 7A, the wavelength range from about 700 nm to 850 nm can, in general, be considered to be the boundary. In the wavelength range higher than the boundary region, the spectral transmittance characteristics for the four types of filters do not have a distinguishable difference from each other. Therefore, the output values of the pixels generated by the lights transmitted through the four types of filters approximate to each other in this region.

The imaging device according to an embodiment of this disclosure utilizes the characteristics of these four types of filters. That is, in accordance with the characteristics of the image pickup element 102, the point at which the output values of the four types of color filters sufficiently appropriate to and become coincident with each other (i.e., in FIG. 7A, a point around the wavelength of 840 nm) is taken as the boundary between the visible light region and the near infrared light region. Among the output signals from the image pickup element 102, the component representing the visible light region (visible light component) is maintained, while the component representing the near infrared light region (near infrared light component) is separated and removed therefrom.

The characteristics of the four types of filters will be described. The transmittances XT, YT, ZT, TT of the four types of filters X, Y, Z, and T in an arbitrary wavelength within the visible light region are expressed by the following Equation 6:

$$TT = \alpha XT + \beta YT + \gamma ZT.$$ Equation 6

The transmittance TT of the fourth filter T can be thus expressed by a linear sum of the transmittances XT, YT, ZT of the three types of filters X, Y, Z, and a coefficient $\alpha$, a coefficient $\beta$, and a coefficient $\gamma$, which are either positive or negative, are uniquely determined. That is, the imaging device 10 needs to use four color filters which satisfy the condition of Equation 1. As described above, it is possible to satisfy the condition by using an RGB filter used in many image sensors. Additionally, as the fourth filter T, a clear filter C which transmits an entire visible light region including the near infrared light is used.

Figure 7B:
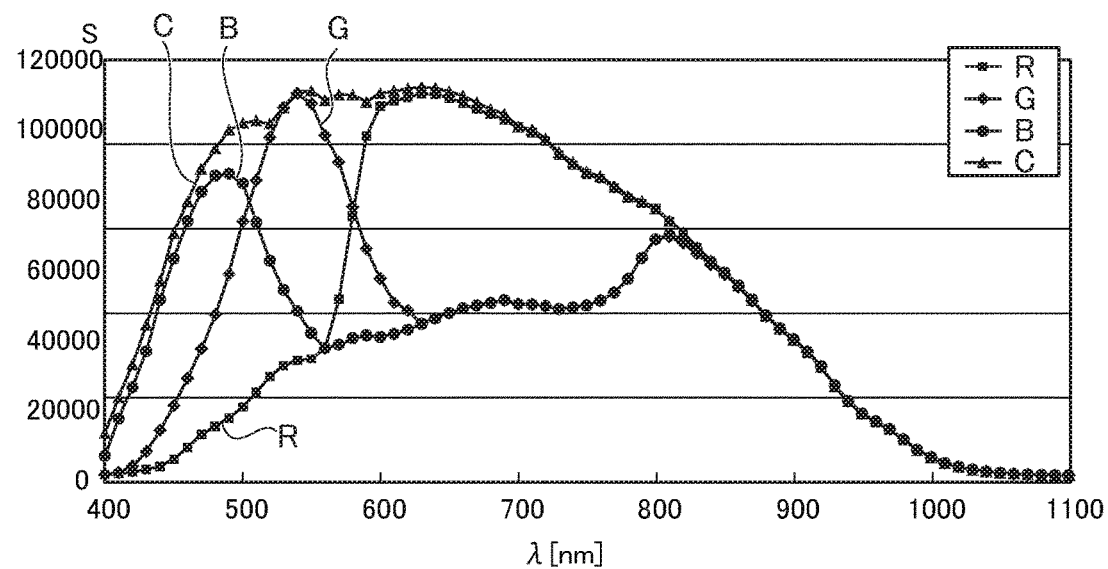
FIG. 7B is a graph showing an example of spectral transmittance characteristics in which gradation-conversion process has been executed onto the spectral transmittance characteristics of FIG. 7A such that input luminance of the image pickup element and an output signal establish a linear relationship.
Figure 7C:
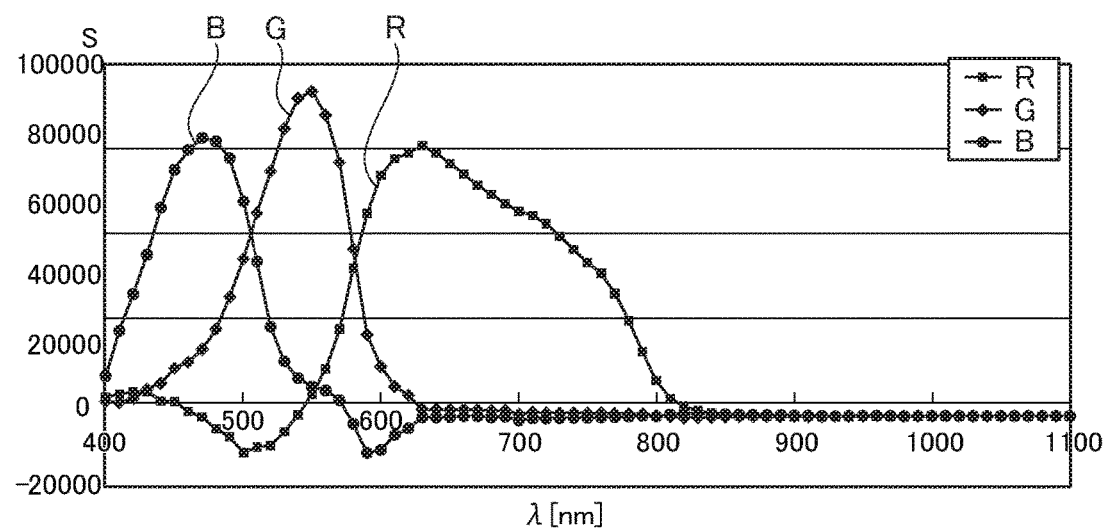
FIG. 7C is a graph showing an example of spectral transmittance characteristics after near infrared light component has been removed from the signal of FIG. 7B.

Based on the spectral characteristics of the four types of filters with respect to the wavelengths $\lambda$, the spectral sensitivities S of the image pickup element 102 as shown in FIG. 7A are determined. Additionally, the relationship between the input luminance I inputted to the image pickup element 102 and the output voltage signal e outputted from the image pickup element 102 is transferred into a linear relationship through the later-described gradation converting process. As a result, the spectral sensitivities S shown in FIG. 7B are obtained. Based on the spectral sensitivities S shown in FIG. 7B, it is possible to calculate the coefficients $\alpha$, $\beta$, $\gamma$ in the Equation 1.

In accordance with the spectral sensitivities S obtained with respect to the light having a plurality of different wavelengths $\lambda$, each of the coefficients $\alpha$, $\beta$, $\gamma$ is determined to be in an allowable range with respect to a true value using a least-squares method. Here, this embodiment may be applied to not only an RGBC filter array but also an array of arbitrary four types of filters which are expressed by the Equation 1.

The image pickup element 102 outputs an output signal RAW0 (12-bit) through the RGB filter. The signal separating part 103 then executes separation process to separate the output signal RAW0 into two signals used in color signal process and in luminance signal process, respectively. Each of the two output signals after the separation is identical to the output signal RAW0 before the separation.

Linear Transforming Process

Among the two output signals RAW0, RAW0 separated in the signal separating part 103, the output signal linear-transforming part 104 executes linear transforming process (linearization) on the output signal RAW0 for the color signal process. Here, it is assumed that the image pick-up element 102 has a predicted linear characteristic 612 in which the output voltage signal in the image-pickup element 102 linearly varies with respect to the input luminance I. Accordingly, the output signal linear-transforming part 104 transforms a signal corresponding to a range, in which the input luminance I and the output voltage signal e have a non-linear relationship, into a signal having a linear relationship.

Figure 6:
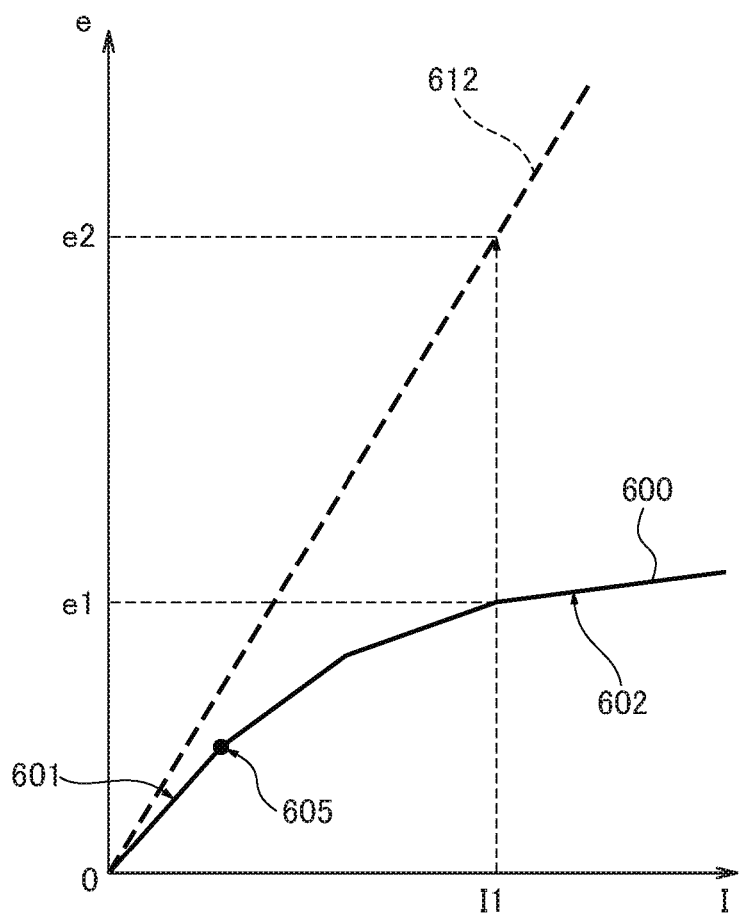
FIG. 6 is an explanatory view for explaining signal transformation process executed by an output signal linear-transforming part in the First Embodiment of this closure.

As shown as the input-output characteristic 600 in FIG. 6, the image pickup element 102 has a linear characteristic 601 in a range in which the input luminance I is relatively small. In this range, the image pickup element 102 outputs an output signal which varies linearly with respect to the input luminance I.

Additionally, the image sensor 102 has a non-linear characteristic 602 in a range in which the input luminance I is relatively large. In the range, the image pickup element 102 outputs an output signal which varies non-linearly with respect to the input luminance I.

The range having the linear characteristic 601 and the range having the non-linear characteristic 602 are connected at a connection point 605. Here, the output voltage signal e having the non-linear characteristic 602 may also be referred to as a first output signal S1.

When assuming that linearity of the input-output characteristic is established throughout the entire input luminance range of the image pickup element 102, the input-output characteristic is expressed by the predicted linear characteristic 612, as shown by a dot line in FIG. 6. Here, the output voltage signal e which is predicted to be outputted in accordance with the predicted linear characteristic 612 may also be referred to as a second output signal S2.

In the output signal linear transforming part 104, the first output signal S1 outputted from the imaging element 102 is transformed into the second output signal S2 which is predicted to be outputted from the imaging element 102 by assuming the input-output characteristic shows the predicted linear characteristic 612.

To be specific, in FIG. 6, the signal obtained by the input-output characteristic 600 with respect to an input luminance I1 is the output voltage signal e1. On the other hand, when assuming the input-output characteristic is the predicted linear characteristic 612, the predicted signal obtained with respect to the input luminance I1 becomes the output voltage signal e2. Accordingly, the output signal linear-transforming part 104 executes process to multiply the output voltage signal e1 by e2/e1.

While there are many possible linearization methods, the output signal linear transforming part 104 may transform the output signal using, for example, Look Up Table (LUT). That is, the input-output characteristics of the image pickup element 102 are measured as many as the number of all input-output characteristics, which are exemplarily shown in FIG. 4A beforehand. Further, the relationship between the output voltage signal e1 obtained at an input luminance I and the output voltage signal e2 expected to be outputted by assuming the input-output characteristics to be linear characteristics is stored in the LUT in advance. The input signal linear transforming part 104 executes the gradation converting process by retrieving the corresponding output voltage signal e2 stored in the LUT based on the number of the current input-output characteristic and the output voltage signal e1 actually measured.

Note that the output signal RAW0 of the imaging device 10 and the information that is stored in the LUT to be used for the gradation converting process are all treated as digital information. In the First Embodiment, the number of bits necessary for storing all of the information is calculated as follows. When the image pickup element 102 having the input-output characteristics shown in FIG. 4A is used, the necessary number of the bid to fully express the input-output characteristics is 4-bit since the total number of the input-output characteristics is 10. Further, the output signal RAW0 of the image pickup element 102 is 12-bit. Additionally, the necessary bit number for LUT (output voltage value after the linear transformation) is 20-bit (>120 dB) since the dynamic range of the input luminance is approximately 120 dB at the maximum (1:$10^5$).

Through the linear transforming process executed by the output signal linear-transforming part 104, a 20-bit linearized output signal RAW1 is obtained from the 12-bit output signal RAW0.

As the method of the linear transforming process, various methods may be used. For example, a method in which a position of a bending point in the input-output characteristic of the image pickup element 102 is predicted and piecewise linear transformation is executed, a method in which approximation to a logarithmic characteristic is performed and the transformation is performed in accordance with an Equation, or other methods may be used.

Linear Interpolation Process for Color Signal

Figure 8:
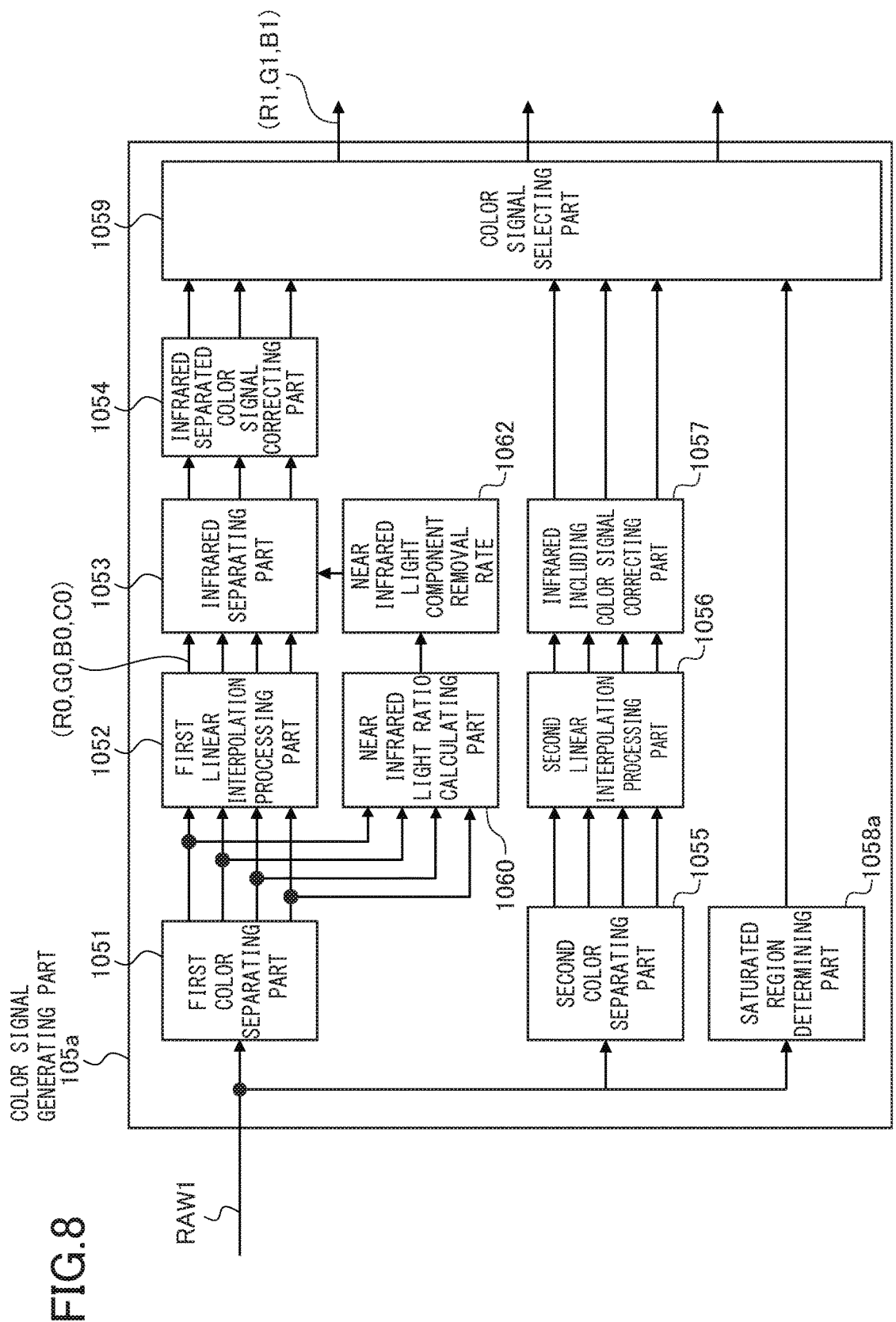
FIG. 8 is an explanatory view for explaining a detailed structure of a color signal generating part in the First Embodiment of this disclosure.

The color reproduction process executed by the color signal generating part 105*a* will be described with reference to FIG. 8. FIG. 8 is a diagram showing the detailed structure of the color signal generating part 105*a*. The color signal generating part 105*a* includes a first color separating part 1051, a first linear interpolation process part 1052, an infrared separating part 1053 (near infrared light component separating part), an infrared separated color signal correcting part 1054, a near infrared light ratio calculating part 1060, a near-infrared-light-component removal rate table 1062, a second color separating part 1055 (saturation suppressing part), a second linear interpolation processing part 1056, an infrared including color signal correcting part 1057, a saturated region determining part 1058a (color saturation detecting part), and a color signal selecting part 1059.

The linearized output signal RAW1 (20-bit) which has been transformed by the output signal linear transforming part 104 (see FIG. 1) is separated into three signals. Each of the separated signals is then inputted to the first color separating part 1051, the second color separating part 1055 (saturation suppressing part), and the saturated region determining part 1058a (color saturation detecting part). Here, each of the three signals obtained by the separation is identical to the linearized output signal RAW1.

The first color separating part 1051 separates the linearized output signal RAW1 into four linearized color signals (R0, G0, B0, C0) corresponding to the colors constituting the linearized output signal RAW1. Here, an output from a pixel having no color signal is zero (0) (blank).

The first linear interpolation process part 1052 linearly-interpolates neighboring pixel values to acquire a pixel value which is expected to be observed in the blank pixel generated when separating a signal in the first color separating part 1051. Through this process, the first linear interpolation process part 1052 generates four linear-interpolated color signals (R0, G0, B0, C0) for each of all the pixels.

The method of the linear interpolation will be described in detail with reference to FIG. 5C. In a filter arranged as shown in FIG. 5C, for example, a filter which transmits blue color light is arranged on a surface of a pixel denoted by B22. Therefore, from the pixel denoted by B22, only an output voltage signal e corresponding to blue color is obtained.

Accordingly, signals corresponding to red color light, green color light, and white color light which are expected to be outputted from the pixel denoted by B22 need to be calculated by interpolating output voltage signals e around the pixel denoted by B22.

For example, the red color light component, which is expected to be outputted from the pixel denoted by B22, is calculated by applying an average value of the output voltage signals e of the neighboring pixels thereof on which the red color filters R are arranged (i.e., the pixels denoted by R11, R13, R31 and R33).

Similarly, the green color light component, which is expected to be outputted from the pixel denoted by B22, is calculated by applying an average value of the output voltage signals e of the neighboring pixels thereof on which the green color filters G are arranged (i.e., the pixels denoted by G12 and G32).

The white color light component, which is expected to be outputted from the pixel denoted by B22, is also calculated by applying an average value of the output voltage signals e of the neighboring pixels thereof on which the clear filters are arranged (i.e., the pixels denoted by C21 and C23).

Note that, during the aforementioned process, the missing color signals may be estimated and calculated by executing digital filtering process for frequency selection by using a digital filter such as a low-pass filter and a band-pass filter.

Infrared Light Separating Process

The infrared light separating process will be described with reference to FIG. 8. A near infrared light ratio calculating part 1060 calculates a ratio Rr of the near infrared light component contained in the linear-interpolated color signals (R0, G0, B0, C0) using the following Equation 7.

$$Rr=(R0+G0+B0-C0)/2C0 \qquad \text{Equation 7}$$

The near-infrared-light-component removal rate table 1062 stores the removal rates E (Rr) of the near infrared light component with respect to the ratios Rr of the near infrared light component. The detailed example of the table will be described later.

The infrared separating part 1053 removes, in accordance with the ratios Rr of the near infrared light component contained in the linear interpolated color signals (R0, G0, B0, C0), the near infrared light component by the removal rate E (Rr) stored in the near-infrared-light-component removal rate table 1062 (i.e., removes the proportion corresponding to the removal rate E (Rr) in accordance with the table 1062) from the four linear-interpolated color signals (R0, G0, B0, C0) obtained in the first linear interpolation process part 1052.

That is, the infrared separating part 1053 obtains infrared-separated color signals (Ra, Ga, Ba) (infrared-separated signals). To be specific, the infrared-separated color signals (Ra, Ga, Ba) are calculated by Equations 8, 9, and 10 with the ratio of the near infrared light component. In the following Equations, "I" represents an amount of near infrared light component.

$$Ra=R0-I*E(Rr) \qquad \text{Equation 8}$$

$$Ga=G0-I*E(Rr) \qquad \text{Equation 9}$$

$$Ba=B0-I*E(Rr) \qquad \text{Equation 10}$$

Figure 9A:
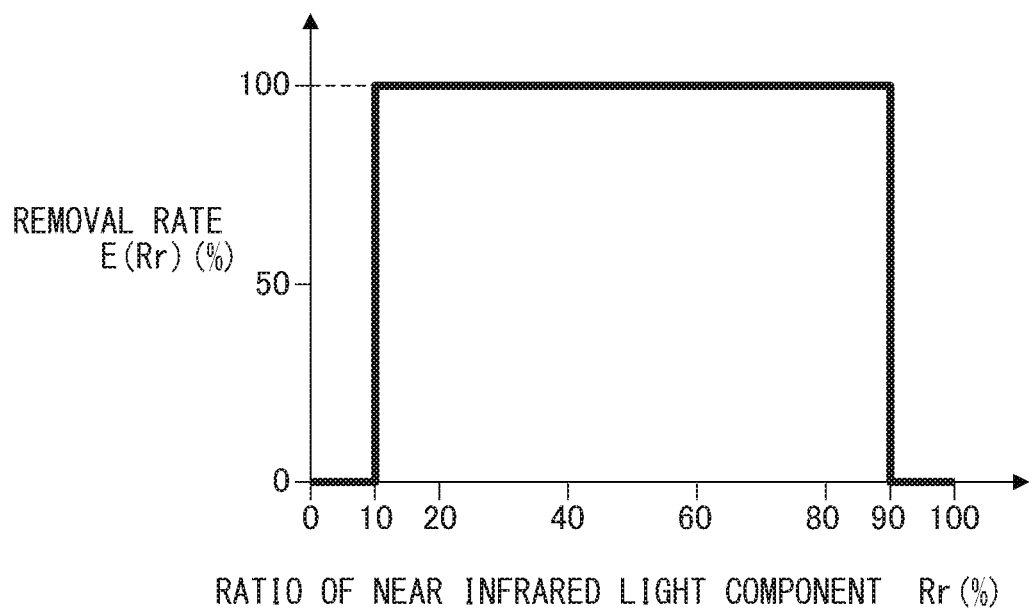
FIG. 9A is a first graph showing an example of a near infrared light component removal rate table.
Figure 9B:
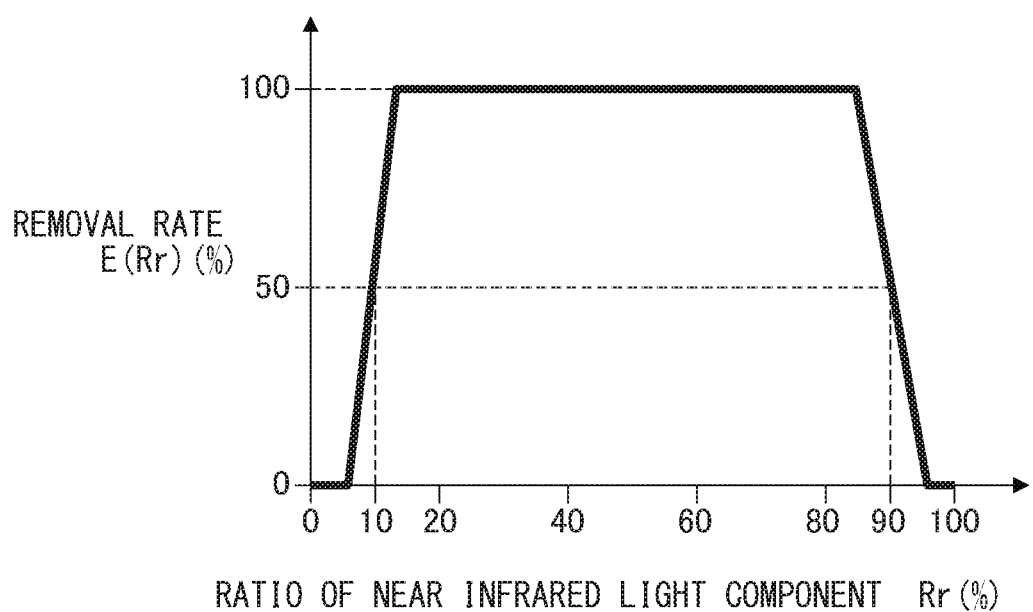
FIG. 9B is a second graph showing an example of a near infrared light component removal rate table.

FIG. 9A and FIG. 9B are examples of the near-infrared-light-component removal rate tables 1062, which store removal rates E (Rr) of near-infrared light. In the example of FIG. 9A, when the ratio Rr of the near infrared light component is within a predetermined range, for example from 10% to 90%, the removal rate E (Rr) of the near infrared light component is set to 100%. That is, in this case, all the near infrared light component are removed. Similarly, when the ratio Rr of the near infrared light component is less than 10% or exceeds 90%, the removal rate E (Rr) of the near infrared light component is set to 0%. That is, in this case, none of the near infrared light component is removed.

On the other hand, in the example of FIG. 9B, when the ratio Rr of the near infrared light component is slightly less than 10% or slightly greater than 90%, the removal rate E (Rr) of the near infrared light component is set to change continuously and smoothly. With the removal rate E (Rr) of the near infrared light component of FIG. 9A, color differences between before and after the threshold values may become too large. Therefore, it is desirable to have the removal rate E (Rr) as shown in FIG. 9B.

FIG. 10 shows an example of the ratios Rr of the near infrared light component in popular light sources and an example of the removal rate E (Rr) of the near infrared light component set to each of the light sources used in this embodiment. In this example of FIG. 10, the removal rate E (Rr) of the near infrared light component for an infrared LED (IR LED) is set to 0%, as the ratio Rr of the near infrared light component for the IR LED is 90 to 100% (i.e., Rr=90-100%). That is, it is set not to remove the near infrared light component. With this, it becomes possible to reduce the influence of the noise as described in the Solution to Problem.

For an incandescent lamp (Rr=70-89%), the sunlight (Rr=60-69%), and a discharge lamp (Rr=10-59%), the removal rates E (Rr) are set to 100%. That is, it is set to remove all the near infrared light component. As a result, it is possible to realize accurate color reproduction.

For an LED (Rr=0-9%), the removal rate E (Rr) is set to 0%. That is, it is set not to remove the near infrared light component. With this, it becomes possible to prevent a decrease of the S/N ratio, as described in the Solution to Problem.

The infrared separated color signal correcting part 1054 executes color signal correcting process to correct the colors reproduced by the imaging device 10 to be the target colors in accordance the technique adopted in the imaging device 10 including the image pickup elements having general linear characteristics. Here, such technique is known as linear matrix calculation based on target colors.

To be specific, the infrared separated color signal correcting part 1054 performs the linear matrix calculation using the Equation 11 on the infrared-separated signals (Ra, Ga, Ba) outputted from the infrared separating part 1053. Accordingly, the infrared separated color signal correcting part 1054 corrects the color reproduced in non-saturated pixels (normal pixels) to be the target colors, and outputs the three linear-corrected color signals (Xc, Yc, Zc)

$$\begin{bmatrix} Xc \\ Yc \\ Zc \end{bmatrix} = \begin{bmatrix} x11 & x12 & x13 \\ y11 & y12 & y13 \\ z11 & z12 & z13 \end{bmatrix} \begin{bmatrix} X \\ Y \\ Z \end{bmatrix} \quad \text{Equation 11}$$

Here, the linear-corrected color signals obtained from the image pickup elements 102 having the aforesaid RGBC filter are referred to as (R1, G1, B1). The linear-corrected color signals (R1, G1, B1) are calculated by substitution of X=R, Y=G, and Z=B in the Equation 6.

Clipping Process

Similar to the first color separating part 1051, the linearized output signal RAW1 is inputted to the second color separating part 1055 (saturation suppressing part) and is separated into four color signals (a blank zero (0) is inserted into the pixel without a color signal). Here, before the separation, the second color separating part 1055 executes clipping process with respect to a saturation signal level (in a case of 12-bit, 4095) by use of a clip level predetermined for each color signal.

The clipping process is process which sets a pixel value for a linearized output signal RAW1 to a predetermined value when the pixel value thereof exceeds the predetermined value.

Figure 11A:
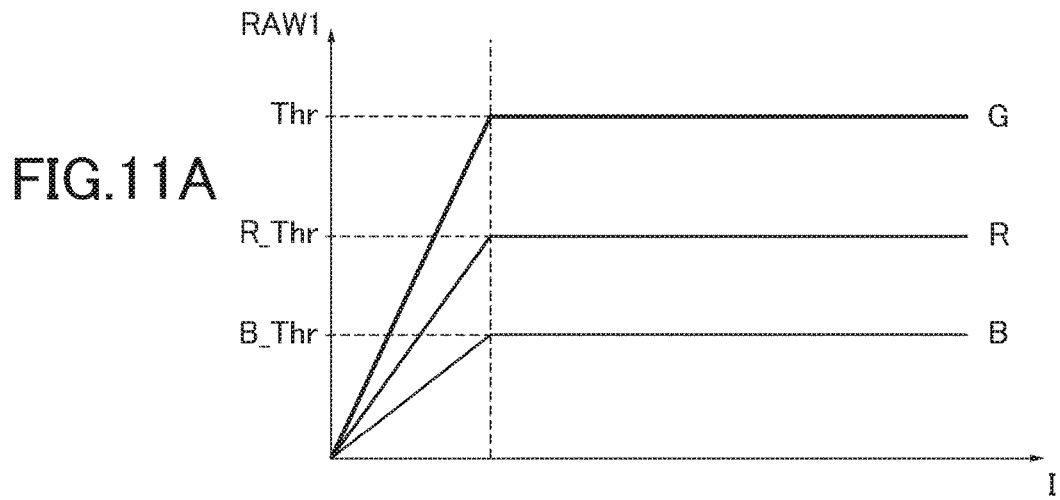
FIG. 11A is an explanatory view for explaining an overview of clipping process.

FIG. 11A shows an example of the clipping process. When a signal outputted from a pixel arranged with a green color filter G is larger than a predetermined value Thr, the pixel value in the pixel is forcibly set to the predetermined value Thr.

Simultaneously, a predetermined value R_Thr is set for a pixel arranged with a red color filter such that the signal outputted from a pixel arranged with a red color filter R is also saturated when white color light having the same luminance is incident onto the pixel. Note the predetermined value R is calculated by the Equation 12.

$$R\_Thr = Thr * \frac{G\_Gain}{R\_Gain} \quad \text{Equation 12}$$

Here, each of G_gain and R_gain is a parameter to adjust the corresponding color temperature. The G_gain expresses intensity of the green color, and R_gain expresses intensity of the red color.

Similarly, a predetermined value B_Thr is set with respect to a pixel arranged with the blue color filter. The predetermined value B_Thr is calculated by the Equation 13.

$$B\_Thr = Thr * \frac{R\_Gain}{B\_Gain} \quad \text{Equation 13}$$

Here, B_gain is a parameter to adjust the color temperature. The B_gain expresses intensity of the blue color.

Then, the second linear interpolation processing part 1056 executes linear interpolation process similar to the first linear interpolation process part 1052. The infrared including color signal correcting part 1057 performs the linear matrix calculation on the four color signals, which includes the near infrared light, outputted from the second linear interpolation processing part 1056 by means of the Equation 14. With this, the infrared including color signal correcting part 1057 corrects the colors reproduced in the saturated region to be the target colors, and then outputs three signals (Xs, Ys, Zs) of the four corrected linear-corrected color signals (Xs, Ys, Zs, Ts).

$$\begin{bmatrix} Xs \\ Ys \\ Zs \\ Ts \end{bmatrix} = \begin{bmatrix} x'11 & x'12 & x'13 & x'14 \\ y'11 & y'12 & y'13 & y'14 \\ z'11 & z'12 & z'13 & z'14 \\ t'11 & t'12 & t'13 & t'14 \end{bmatrix} \begin{bmatrix} X+i \\ Y+i \\ Z+i \\ T+i \end{bmatrix} \quad \text{Equation 14}$$

It should be noted that with the image pickup element 102 having the aforesaid RGBC filters, the linear-corrected color signals (R1, G1, B1) are calculated by substitution of X=R, Y=G, Z=B, and T=C in the Equation 6. The linear-corrected color signals (R1, G1, B1) calculated as described are infrared non-separated color signals in which the near-infrared light is not separated.

Saturated Region Determination Process

The color signal selecting part 1059 determines and selects which of the two types of the linear-corrected color signals (infrared-separated color signals, infrared non-separated color signals) generated in parallel for each pixel to use. To this end, firstly, the saturated region determining part 1058a (color saturation detecting part) generates a binary signal which only expresses a saturated pixel or a neighboring pixel of the saturated pixel (i.e., pixel affected by saturated pixel in linear interpolation) with respect to the linearized output signal RAW1.

Specifically, with respect to a binary image in which a pixel determined to have a signal equal to or greater than a saturation signal level is taken as one (1) and the other pixels are taken as zero (0), dilation (expansion) process is executed in accordance with a kernel size during the linear interpolation process. The binary image signal resulting from the dilation process is then inputted to the color signal selecting part 1059 as a saturated pixel signal which represents a saturated pixel. Here, by executing the dilation process of a region, neighboring pixels which are considered to be affected by the saturated pixel are extracted together with the saturated pixel.

The color signal selecting part 1059 selects which of the two types of the color signals to be outputted depending on whether a subject pixel is extracted as the saturated pixel or as the neighboring pixel of the saturated pixel. That is, when the binary image signal is zero (0), it is determined that the subject pixel is neither the saturated pixel nor the neighboring pixel of the saturated pixel, and thus the infrared separated color signals (R1, G1, B1) are selected.

On the other hand, when the binary image signal is one (1), it is determined that the subject pixel is the saturated pixel or the neighboring pixel of the saturated pixel, and thus the infrared non-separated color signals (R1, G1, B1) in which the clipping process has been performed are selected.

Accordingly, from the linearized output signal RAW1 (20-bit), three linear-corrected color signals (R1, G1, B1) (signed 21-bit) in which the near infrared light component is separated so as to be consistent with human color vision characteristics, and colorfulness, hue, and the like are adjusted are selected and outputted.

Figure 11B:
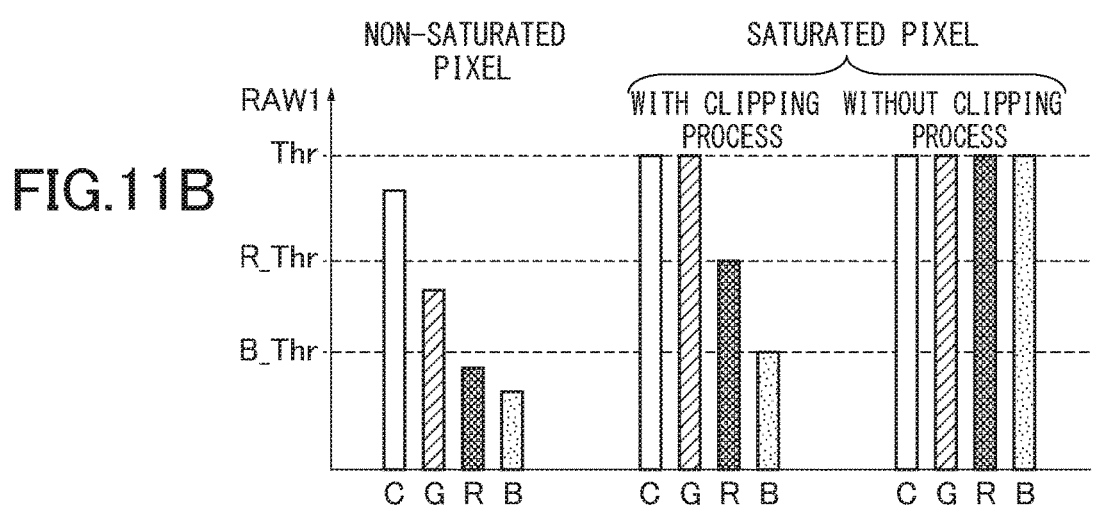
FIG. 11B is a graph showing an example to which the clipping process is applied, and an example of gradation before the clipping process was executed.
Figure 11C:
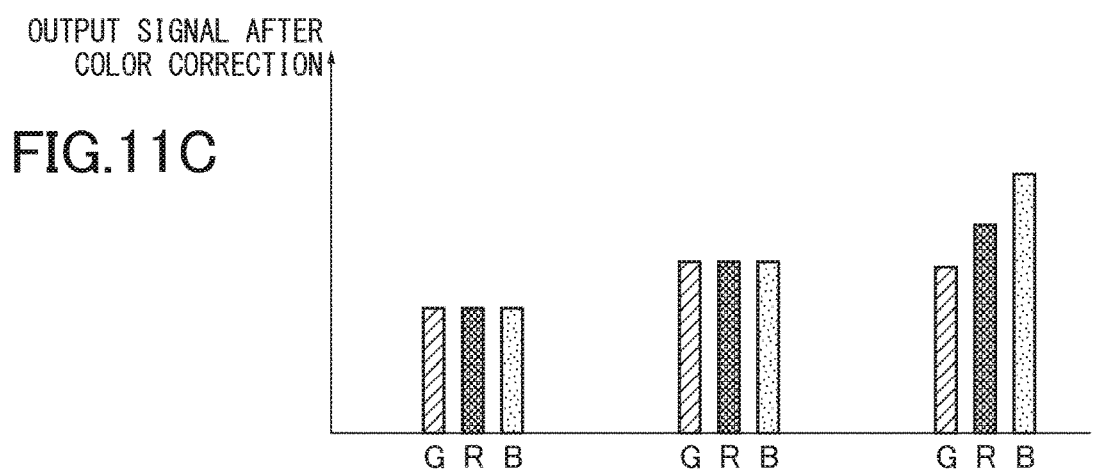
FIG. 11C is a graph showing an example of gradation after executing the clipping process.

The selection process of the color signals will be described with reference to FIG. 11B and FIG. 11C. As shown in FIG. 11B and FIG. 11C, in a non-saturated pixel or in a saturated pixel with the clipping process has been performed, a signal after the color correction is achromatic. On the other hand, in a saturated pixel without the clipping process, the color correction will result in losing RGB balance. As a result, a color shift occurs as shown in FIG. 11C. Therefore, as described above, with a saturated pixel signal, an occurrence of a color shift can be prevented by selecting a color signal in which the clipping process has been executed.

Color Reproducing Process by Combining Color Luminance

An output signal RAW0 which is not used in the color signal process of the two output signals RAW0 separated by the signal separating part 103 is used in luminance signal process.

The luminance signal generating part 107 generates a luminance signal Y1 (12-bit) from the output signal RAW0. The contents of the process are similar to the process executed in the output signal linear-transforming part 104, except that color separation is not performed. Further, it is possible to perform digital filtering for frequency selection by use of a digital filter such as a low-pass filter and a band-pass filter.

The luminance signal correcting part 108 performs contrast adjustment such as gamma correction and histogram correction with respect to the luminance signal Y1, and generates a luminance corrected signal Y2 (12-bit).

Then, by use of the linear-corrected color signal and the luminance corrected signal, the color-luminance combining part 109 generates video signals which are outputted to the image output part 110.

Color Luminance Combining Process

Hereinafter, a method of generating video signals (R2, G2, B2) using the linear-corrected color signal (R1, G1, B1), which is obtained from the image pickup element 102 equipped with the RGBC filter, and the luminance corrected signal Y2 will be described sequentially.

Figure 12:
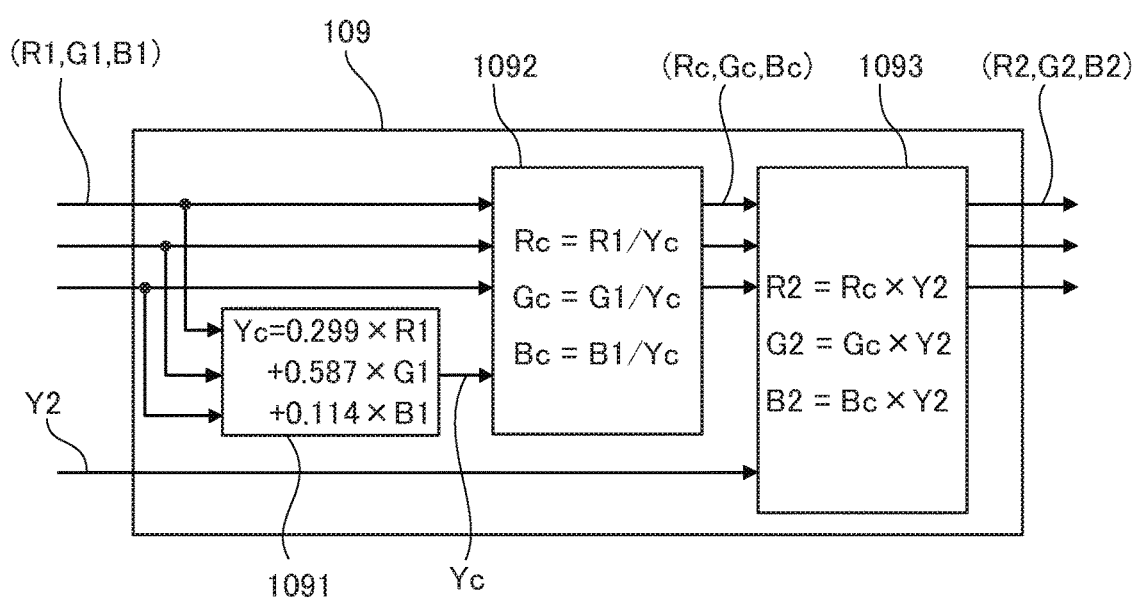
FIG. 12 is an explanatory view for explaining combining process of color signals and a luminance signal executed by a color-luminance combining part of the First Embodiment of this disclosure.

FIG. 12 shows an internal structure of the color-luminance combining part 109. First, the linear-corrected color signals (R1, G1, B1) are each separated into two signals, and a processing block 1091 calculates a luminance component Yc from one of the separated linear-corrected color signals (R1, G1, B1) using Equation 15:

$$Yc=0.299R1+0.587G1+0.114B1 \qquad \text{Equation 15}$$

In Equation 10, each coefficient multiplied to each component of the linear-corrected color signals (R1, G1, B1) is an example of a value calculated as a transformation coefficient used to transform RGB chromaticity into luminance.

In the calculation of Equation 10, a range of the values of the linear-corrected color signals (R1, G1, B1) (signed 21-bit) is large. Therefore, the linear-corrected color signals (R1, G1, B1) are transformed into floating point, and floating-point calculation (arithmetic) is performed.

Next, a processing block 1092 derives each component of the linear-corrected color signals (R1, G1, B1) by the value of the luminance component Yc calculated by the Equation 10 to normalize the linear-corrected color signals (R1, G1, B1), as shown by Equation 16, Equation 17, and Equation 18. Accordingly, the normalized color signals (Rc, Gc, Bc) are generated. Note this calculation (arithmetic) is performed as the floating-point calculation (arithmetic)

$$Rc=R1/Yc \qquad \text{Equation 16}$$

$$Gc=G1/Yc \qquad \text{Equation 17}$$

$$Bc=B1/Yc \qquad \text{Equation 18}$$

Then, a processing block 1093 multiplies the normalized color signals (Rc, Gc, Bc) by the luminance corrected signal Y2 generated by the luminance signal-correcting part 108, as shown by Equation 19, Equation 20, and Equation 21. Accordingly, the video signals (R2, G2, B2) which represent output signals of the color-luminance combining part 109 are generated. Note integer process on the calculation results is also executed simultaneously.

$$R2=Xc*Y2 \qquad \text{Equation 19}$$

$$G2=Yc*Y2 \qquad \text{Equation 20}$$

$$Z2=Zc*Y2 \qquad \text{Equation 21}$$

Here, it must be noted that the normalized color signals (Rc, Gc, Bc) have a linear characteristic and the luminance corrected signal Y2 has a non-linear characteristic. Therefore, the video signals (R2, G2, B2), in which the normalized color signals (Rc, Gc, Bc) and the luminance corrected signal Y2 are combined, have a non-linear characteristic.

At this time, relational equations of Equation 22 and Equation 23 are established among the linear-corrected color signals (R1, G1, B1), the luminance corrected signal Y2 and the video signals (R2, G2, B2). In this regard, neither the linear-corrected color signals (R1, G1, B1) nor the video signals (R2, G2, B2) are saturated, and it is assumed that the influence due to an error caused by reduction of a bit width during the calculations is sufficiently small.

$$Y2=0.299R2+0.587G2+0.114B2 \qquad \text{Equation 22}$$

$$R1:G1:B1=R2:G2:B2 \qquad \text{Equation 23}$$

The Equation 22 expresses that the video signals (R2, G2, B2) and the luminance corrected signal Y2 establish a relationship between three primary color vectors and luminance vectors constituted of the three primary color vectors. That is, the Equation shows that the video signals (R2, G2, B2) maintain luminance information of a wide dynamic range which the luminance corrected signal Y2 has.

The Equation 23 expresses that a color composition ratio (hue) of the linear-corrected color signals (R1, G1, B1) and that of the video signals (R2, G2, B2) are identical to each other. Furthermore, together with the Equation 22, the Equation 23 shows that signal strengths (colorfulness) with respect to the luminance signal are identical to each other. That is, it expresses that the color reproducibility which the linear color signals (R0, G0, B0) have been maintained while transforming the linear characteristic into the non-linear characteristic.

The generated video signals (R2, G2, B2) are displayed on the image output part 110 and shown to an occupant in the vehicle.

Process Flow

Figure 13:
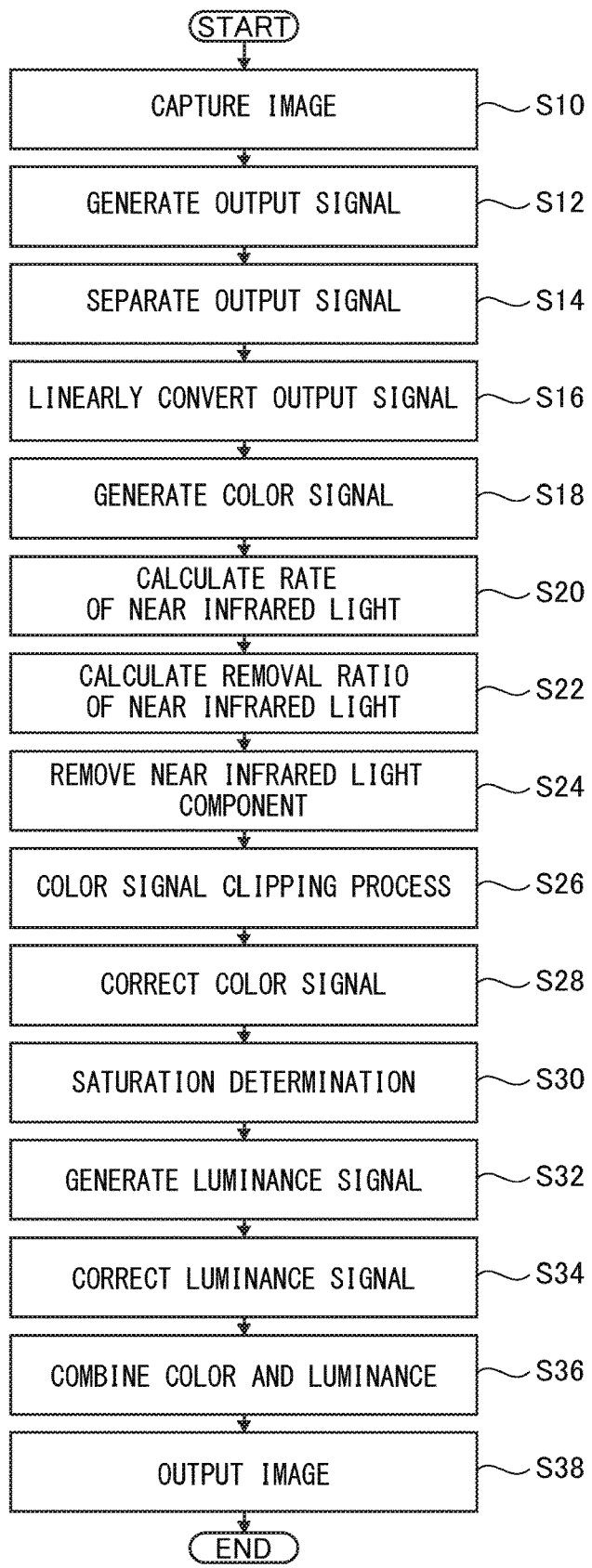
FIG. 13 is a flowchart showing process executed in the First Embodiment of this disclosure.

With reference to a flowchart shown in FIG. 13, the processing flow of the First Embodiment will be described.

In Step S10, the signal separating part 103 sends a command for an imaging timing to the image pickup element 102, and the image pickup element 102 captures an image.

In Step S12, the image pickup element 102 receives light transmitted through the optical system 101, performs the photoelectric conversion, and outputs an output signal RAW0.

In Step S14, the signal separating part 103 separates the output signal RAW0 into two identical output signals RAW0, RAW0.

In Step S16, the output signal linear-transforming part 104 transforms one of the output signals RAW0 into a linearized output signal RAW1 having linearity.

In Step S18, the first color separating part 1051 separates the linearized output signal RAW1 into four signals corresponding to colors of RGBC. Further, the first linear interpolation-processing part 1052 performs the linear interpolation onto a blank pixel generated through the separation by using the pixel values of neighboring pixels in order to generate the linear color signals (R0, G0, B0).

In Step S20, the near infrared light ratio calculating part 1060 calculates the ratio Rr of the near infrared light component contained in the linear color signals (R0, G0, B0).

In Step S22, the removal rate E (Rr) of the near infrared light component corresponding to the ratio Rr of the near infrared light component is calculated with reference to the near infrared light component removal rate table 1062.

In Step S24, the infrared-separating part 1053 separates or removes the infrared light component from the linear color signals (R0, G0, B0) and generates the infrared-separated color signals. Further, the infrared separated color signal correcting part 1054 performs the color correction to generate the linear-corrected color signals (R1, G1, B1).

In Step S26, the second color separating part 1055 (saturation suppressing part) executes the clipping process. Further, the second linear interpolation processing part 1056 generates the linear color signals (R0, G0, B0, C0).

In Step S28, the infrared including color signal correcting part 1057 performs the linear matrix calculation on the four color signals outputted from the second linear interpolation processing part 1056, and generates the four linear-corrected color signals.

In Step S30, the saturated region determining part 1058a (color saturation detecting part) performs the saturation determination with respect to the linearized output signal RAW1, and generates a binary image which only expresses a saturated pixel or a neighboring pixel of the saturated pixel.

In Step S32, the luminance signal generating part 107 generates the luminance signal Y1 from the other one of the output signals RAW0.

In Step S34, the luminance signal correcting part 108 performs the contrast adjustment such as gamma correction and histogram correction with respect to the luminance signal Y1, and generates the luminance corrected signal Y2.

In Step S36, the color luminance combining part 109 combines the linear corrected color signals (R1, G1, B1) and the luminance corrected signal Y2 to generate the video signals (R2, G2, B2).

In Step S38, the generated video signals (R2, G2, B2) are outputted to the image outputting part 110.

As described above, the imaging device 10 according to the First Embodiment is configured to receive light which has transmitted through the filters selectively transmit light having different wavelengths from each other, to generate an output signal RAW0 by converting the received light using the image pickup element 102 having the plurality of pixels, and to remove, by a removal rate E (Rr) determined in accordance with the ratio Rr of near infrared light component calculated for each pixel, from the generated output signal RAW0, to thereby generate an infrared-separated signal (Ra, Ga, Ba). Accordingly, it is possible to remove the near infrared light component in accordance with the amount of the near infrared light component contained in the light received by the image pickup element 102. As a result, it is possible to suppress an increase of color noise regardless of the ratio Rr of the near infrared light component contained in the received light and to prevent the S/N ratio of the color signal from decreasing. Therefore, it is possible to obtain an output signal having both a wide dynamic range and high color reproducibility.

In a case where a traffic light uses a halogen light source which includes both a visible light component and a near infrared light component, the incident light amount increases as the imaging device is close to the front of the optical axis of the traffic signal. Therefore, the color may change as the imaging device approaches the traffic light. To solve this problem, the imaging device 10 according to the First Embodiment decides and sets the removal rate E (Rr) of the near infrared light component based on the ratio Rr of the near infrared light component contained in the received light. As a result, the imaging device 10 can observe the traffic signal with the same colors even when the incident light amount changes. Here, it may be possible to correct or normalize the color signal in accordance with the amount of the visible light component observed by the imaging device. However, when the amount of the visible light component is too small, a harmful effect, for example the correction coefficient is set to be infinity, may occur in the associated calculation. Therefore, it is desirable to execute the process using the ratio Rr of the near infrared light component.

Further, in the imaging device 10 according to the First Embodiment, the removal rate E (Rr) is determined based on the near infrared light component removal rate table 1062 which stores the removal rates E (Rr) of the near infrared light component with respect to the ratio Rr of the near infrared light component contained in the output signal. The infrared separating part (near infrared light component separating part) 1053 then removes the near infrared light component in accordance with the determined removal rate E (Rr). As described, it is possible to easily determine the removal rates E (Rr) at low calculation cost.

Further, in the imaging device 10 according to the First Embodiment, the infrared separating part (near infrared light component separating part) 1053 is configured to continuously and smoothly change the removal rates E (Rr) in accordance with the ratio Rr of the near infrared light component. Therefore, it is possible to prevent a color difference between before and after a threshold value, at which the removal rate E (Rr) of the near infrared light component changes dramatically, from becoming too large. As a result, it is possible to prevent a boundary from being emerged in an area having a substantially uniform luminance distribution such as an area of sky and a road.

The First Embodiment has been described such that the image pickup element 102 has an optical filter including four types of filters (i.e., red filter R, green filter G, blue filter B, and clear filter C). However, the optical filter may replace the clear filter C, which transmits the entire visible light including the near infrared light, with a near infrared filter Ir, which transmits only the near infrared light. Even with this configuration, the optical filter can achieve similar effects to the above-mentioned optical filter of the First Embodiment.

The First Embodiment has been described such that the image pickup element 102 has color filters of primary colors. However, the image pickup element 102 may have a complementary color filter, instead.

The First Embodiment is configured such that the infrared separated color signal correcting part 1054 and the infrared including color signal correcting part 1057 execute the color correcting process, and the luminance signal correcting part 108 executes the luminance correcting process. However, the color correcting process and the luminance correcting process may be executed as needed.

It should be noted that in the First Embodiment, the imaging device is configured to separate the output signal RAW0, which represents the exactly identical image data, into the color signal and the luminance signal and to combine them. However, the color signal and the luminance signal may be generated from different image data, respectively. For example, the image pickup sensor may sequentially switch the input-output characteristics between the one for the color signal and the one for the luminance signal to capture an image, and then combine the two different captured images. Alternatively, the imaging device may use two image pickup elements the imaging ranges of which are similar to each other, capture images having different input-output characteristics for the color signal and the luminance signal, and them combine them.

Although the present disclosure has been described in terms of an exemplary embodiment with reference to the drawings, it is not limited thereto. It should be appreciated that variations may be made in the embodiment described by persons skilled in the art without departing from the scope of the present disclosure defined by the following claims.

The invention claimed is:

1. An imaging device comprising:
an optical filter on which a plurality of filters is arranged in a predetermined manner, the plurality of filters including:
three types of filters configured to selectively transmit light of a visible light region having different wavelengths from each other and to have spectral transmittances equal to each other in a near infrared light region, and
one type of filter in which a spectral transmittance of the visible light region is expressed by a linear sum of the spectral transmittances of the three types of filters and which has a spectral transmittance equal to the spectral transmittances of the three types of filters in the near-infrared light region,
an image pickup element including a plurality of pixels which receive light transmitted through the optical filter, convert the received light into an output signal in accordance with luminance of incident light incident to each of the pixels, and output the output signal from each of the pixels;
a near infrared light ratio calculating part which calculates a ratio of near infrared light component contained in the output signal for each of the pixels; and
an infrared separating part which removes, by a removal rate determined in accordance with the ratio of the near infrared light component, the near infrared light component from each of the output signals for each of the pixels to generate an infrared-separated signal,
wherein the infrared separating part is configured to continuously change the removal rate such that the removal rate become zero (0) when the ratio of the near infrared light component is around 0% and when the ratio of the near infrared light component is around 100%.

2. The imaging device according to claim 1, wherein the infrared separating part is configured to remove the near infrared light component in accordance with the removal rate determined based on a near infrared light component removal rate table which stores the removal rate of the near infrared light component with respect to the ratio of the near infrared light component contained in the output signal.

3. A method of imaging, comprising:
arranging a plurality of filters in a predetermined manner, the plurality of filters including:
three types of filters configured to selectively transmit light of a visible light region having different wavelengths from each other and to have spectral transmittances equal to each other in a near infrared light region, and
one type of filter in which a spectral transmittance of the visible light region is expressed by a linear sum of the spectral transmittances of the three types of filters and which has a spectral transmittance equal to the spectral transmittances of the three types of filters in the near-infrared light region,
receiving light transmitted through the plurality of filters,
converting the received light into an output signal in accordance with luminance of incident light incident to each pixel and outputting signal from each pixel,
calculating a ratio of near infrared light component contained in the output signal for each pixel,
by a removal rate determined in accordance with the ratio of the near infrared light component, removing the near infrared light component from each of the output signals for each pixel to generate an infrared-separated signal, and
continuously changing the removal rate such that the removal rate become zero (0) when the ratio of the near infrared light component is around 0% and when the ratio of the near infrared light component is around 100%.

* * * * *